United States Patent
Leendertse et al.

(10) Patent No.: US 9,290,052 B2
(45) Date of Patent: Mar. 22, 2016

(54) PNEUMATIC TIRE

(71) Applicant: The Goodyear Tire & Rubber Company, Akron, OH (US)

(72) Inventors: Jaap Leendertse, Milan (IT); Wolfgang Karl Maegerle, Erlensee (DE); Dirk Van Eck, Rodgau (DE); Michael Hoelzel, Hainburg (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 325 days.

(21) Appl. No.: 13/772,979

(22) Filed: Feb. 21, 2013

(65) Prior Publication Data

US 2013/0228263 A1 Sep. 5, 2013

Related U.S. Application Data

(60) Provisional application No. 61/606,572, filed on Mar. 5, 2012.

(51) Int. Cl.
*B60C 15/06* (2006.01)
*B60C 13/00* (2006.01)
*B60C 1/00* (2006.01)
*B60C 5/00* (2006.01)
(Continued)

(52) U.S. Cl.
CPC .............. *B60C 5/00* (2013.01); *B60C 11/0058* (2013.04); *B60C 13/04* (2013.01); *B60C 1/0025* (2013.04); *B60C 2001/005* (2013.04); *B60C 2011/016* (2013.04); *B60C 2013/005* (2013.04); *B60C 2013/006* (2013.04); *B60C 2013/045* (2013.04); *Y10T 152/10495* (2015.01); *Y10T 152/10819* (2015.01)

(58) Field of Classification Search
CPC .............. B60C 11/01; B60C 2011/016; B60C 2013/045; B60C 2013/006; B60C 13/00; B60C 2013/005
See application file for complete search history.

(56) References Cited

U.S. PATENT DOCUMENTS

| | | | |
|---|---|---|---|
| 6,478,064 B1 * | 11/2002 | Ueyoko | B60C 5/14 152/525 |
| 7,172,003 B2 * | 2/2007 | Nakamura | B60C 1/00 152/525 |
| 2002/0079033 A1 * | 6/2002 | Suzuki | 152/209.16 |

(Continued)

FOREIGN PATENT DOCUMENTS

| | | | | |
|---|---|---|---|---|
| EP | 0962340 | | 12/1999 | .............. B60C 13/02 |
| FR | 2624442 A1 * | | 6/1989 | .............. B60C 13/00 |

(Continued)

OTHER PUBLICATIONS

Machine Translation: JP 06320918 A; Ishii, Fumito; no date.*

(Continued)

*Primary Examiner* — Michael H Wilson
*Assistant Examiner* — Kendra Ly
(74) *Attorney, Agent, or Firm* — Henry C. Young, Jr.

(57) ABSTRACT

A tire includes a tread portion, a pair of opposing sidewall portions, and a pair of shoulder portions each arranged between the tread portion and one of the sidewall portions, wherein at least on one side of the tire the sidewall and shoulder portions comprise at least a first rubber compound and a second rubber compound, the second rubber compound having a material composition different from that of the first rubber compound.

1 Claim, 1 Drawing Sheet

(51) Int. Cl.
  *B60C 11/00*   (2006.01)
  *B60C 13/04*   (2006.01)

(56) References Cited

U.S. PATENT DOCUMENTS

| | | | | |
|---|---|---|---|---|
| 2005/0045260 | A1* | 3/2005 | Maruoka | B60C 15/0027 152/541 |
| 2006/0118227 | A1* | 6/2006 | Miki | B29D 30/3028 152/524 |
| 2007/0175557 | A1* | 8/2007 | Puhala et al. | 152/209.5 |
| 2009/0114321 | A1* | 5/2009 | Nakamura | B60C 1/0016 152/152.1 |
| 2012/0048444 | A1* | 3/2012 | Miyazaki | C08L 7/00 152/543 |

FOREIGN PATENT DOCUMENTS

| | | | | | |
|---|---|---|---|---|---|
| JP | 01317811 | A | * | 12/1989 | B60C 13/00 |
| JP | 05169928 | A | * | 7/1993 | |
| JP | 06106922 | A | * | 4/1994 | |
| JP | 06320918 | A | * | 11/1994 | B60C 13/00 |
| JP | 2002362116 | A | * | 12/2002 | |
| JP | 2005053354 | A | * | 3/2005 | |
| JP | 2009090776 | A | * | 4/2009 | B60C 17/00 |
| JP | 2010132235 | A | * | 6/2010 | |
| JP | 2011073464 | A | * | 4/2011 | |

OTHER PUBLICATIONS

Machine Translation: JP 2009090776 A; Sakaguchi, Tetsuya; no date.*
Machine Translation: JP 2011073464 A; Yoshinaka, Nobuyoshi; no date.*
Machine Translation: FR 2624442 A1; Suzuki Shigehiko; no date.*
Machine Translation: JP 2010132235 A; Sakamoto, Masayuki; no date.*
Machine Translation: JP 06106922 A; Hanada, Ryoji; no date.*
Machine Translation: JP 2005053354 A; Matsuyama, Koji; no date.*
Machine Translation: JP 05169928 A; Akiyama, Ichiro; no date.*
Machine Translation: JP 2002362116 A; Kuwabara, Takao; no date.*
European Search Report received by Applicants Jun. 12, 2013.

* cited by examiner

PNEUMATIC TIRE

FIELD OF THE INVENTION

The present disclosure relates to a tire including a tread portion, a pair of opposing sidewall portions, and a pair of shoulder portions each arranged between the tread portion and one of the sidewall portions.

BACKGROUND OF THE INVENTION

The statements in this section merely provide background information related to the present disclosure and may not constitute prior art.

The drive properties and thus drive comfort of vehicles equipped with pneumatic tires traveling on road surfaces is greatly influenced by the properties of the tires used. In this connection the tread portion of a tire is the point of contact between a vehicle and the road surface. Every road surface has some degree of unevenness, e.g. due to small bumps present in the road surface. Thus, the tire cannot be made of too stiff a material, as otherwise the tires merely transmit the road surface properties to the vehicle. For this reason the tire has to be made of a material which is slightly deformable so that influences of the road surface on the drive property of the vehicle can be reduced.

Different types of rubber compounds are used to manufacture different types of tires. The type of compound used is generally selected in dependence on its use, for example, in dependence on whether a summer or winter tire is desired and on the types of vehicle speeds the tire has to withstand without failing. However, if a rubber compound is used which is very deformable, then this leads to an increase in heat build-up in the tire and an increase in rolling resistance which in turn leads to a higher fuel consumption and a higher tire wear. In addition, handling performance of the tire generally decreases with increasing deformability.

One object of this disclosure is to provide a tire which simultaneously has a low rolling resistance and a high handling performance.

SUMMARY OF THE INVENTION

Accordingly, the present disclosure provides a tire including a tread portion, a pair of opposing sidewall portions, and a pair of shoulder portions each arranged between the tread portion and one of the sidewall portions, wherein at least on one side of the tire the sidewall and shoulder portions comprise at least a first rubber compound and a second rubber compound, the second rubber compound having a material composition different from that of the first rubber compound.

In another feature, the first rubber compound is made of a low hysteresis tire material to form a low hysteresis compound and/or has a hysteresis which is lower than that of the second rubber compound.

In another feature, the hysteresis of the first rubber compound is at least 20 percent lower, preferably at least 50 percent lower, than that of the second rubber compound. Under its own weight and/or under the weight of a vehicle a rotating tire experiences repeated cycles of deformation and recovery, i.e. compression and depression, thereby converting mechanical energy into heat. The term hysteresis refers to the energy loss under sinusoidal deformation of a rubber compound. In particular, hysteresis of a rubber compound is defined as the energy loss per unit volume per cycle, as described in standard ISO 4664-1:2005 which provides guidance on the determination of dynamic properties of vulcanized and thermoplastic rubbers. In forced vibration testing, hysteresis may be determined, for instance, under the following conditions: a temperature of 20° C., a strain (compression) of 10 percent, and a frequency of 10 Hz.

In still another feature, the first rubber compound is disposed in at least the shoulder portion.

In another feature, in inwardly axial direction, the first rubber compound extends to underneath the tread portion. In particular, the tire further includes a tread reinforcing ply portion, wherein, in inwardly axial direction, the first rubber compound extends to underneath the tread reinforcing ply portion.

The first rubber compound may extend into the sidewall portion.

In another feature, the tread portion includes a pair of opposing wings, wherein, in outwardly axial direction, the first rubber compound extends beyond the respective wing.

In another feature, the first rubber compound extending beyond the respective wing appears at a surface of the tire at the shoulder portion, i.e. in a region of the tire which may come in direct contact with the road when cornering.

In yet another feature, the first rubber compound is arranged between the tread portion and the second rubber compound.

In another feature, the second rubber compound is made of a high stiffness tire material to form a high stiffness compound and/or has a stiffness which is higher than that of the first rubber compound.

In another feature, the stiffness of the second rubber compound is at least 20 percent higher, preferably at least 50 percent higher, than that of the first rubber compound.

The stiffness of a rubber compound may be determined in accordance with standard ASTM D5992, a guide for material properties needed in engineering design using plastics. In an additional feature, the second rubber compound is disposed in the sidewall portion.

In another feature, the second rubber compound is arranged as an axially outermost compound of the tire.

In another feature, in radial section, the second rubber compound has a trapezoidal shape with one pair of parallel sides each extending in radial direction.

In another feature, in axial direction, the second rubber compound overlaps at least one of the first rubber compound and a third rubber compound disposed radially inwardly from the second rubber compound.

In another feature, the second rubber compound is arranged such that it does not come in direct contact with the road under any circumstances.

In a further feature, the tire further includes a pair of opposing bead portions, wherein the second rubber compound is arranged between the first rubber compound and the respective bead portion.

In another feature, the tire further includes a pair of opposing ply turn-up portions radially outwardly extending to at least the respective second rubber portion.

The ply turn-up portion may radially outwardly extend to or extend into the first rubber compound. In particular, the ply turn-up portion may end where it contacts the first rubber compound. In the region of the second rubber compound, the ply turn-up portion may be arranged at or adjacent to an axially inwardly facing side of the second rubber compound.

In another feature, at least one of the shoulder and sidewall portions further includes a third rubber compound.

In a further feature, the third rubber compound has at least one of a hysteresis which is higher than that of the first rubber compound and a stiffness which is lower than that of the second rubber compound.

In another feature, the tire further includes a pair of opposing bead portions, wherein the third rubber compound is disposed in the sidewall portion and is arranged between the second rubber compound and the respective bead portion.

In a further feature, the tread portion includes an inner tread section made of an inner tread compound and an outer tread section made of an outer tread compound, the inner tread compound having a material composition different from that of the outer tread compound.

In another feature, the inner tread compound has a wet static friction or grip which is higher than that of the outer tread compound.

In a further feature, the outer tread compound has a dry static friction or grip which is higher than that of the inner tread compound.

In another feature, the inner tread section has an axial width that is different from that of the outer tread section, i.e. the tread portion is an asymmetric tread portion.

In a further feature, the axial width of the inner tread section is larger than that of the outer tread section.

In a further aspect, the present disclosure provides a tire including a tread portion extending between a pair of shoulder portions and a pair of sidewall portions each extending between one of a pair of opposing bead portions and one of the shoulder portions, wherein at least on one side of the tire the sidewall and sidewall portions include a low hysteresis compound optimized for low rolling resistance and a high stiffness compound optimized for high handling performance.

Providing a tire with at least two rubber compounds of different material composition in the sidewall/shoulder-region of the tire increases the construction possibilities of the tire. It is known that different parts of the tire are subjected to the influences of the road surface in different ways. Selecting a tire construction where different materials are used to form different parts of the tire enables a targeted construction of the different tire parts. As such the respective materials can be optimized so that they fulfill certain criteria in regions where they are most needed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE INVENTION

Figure 1A:
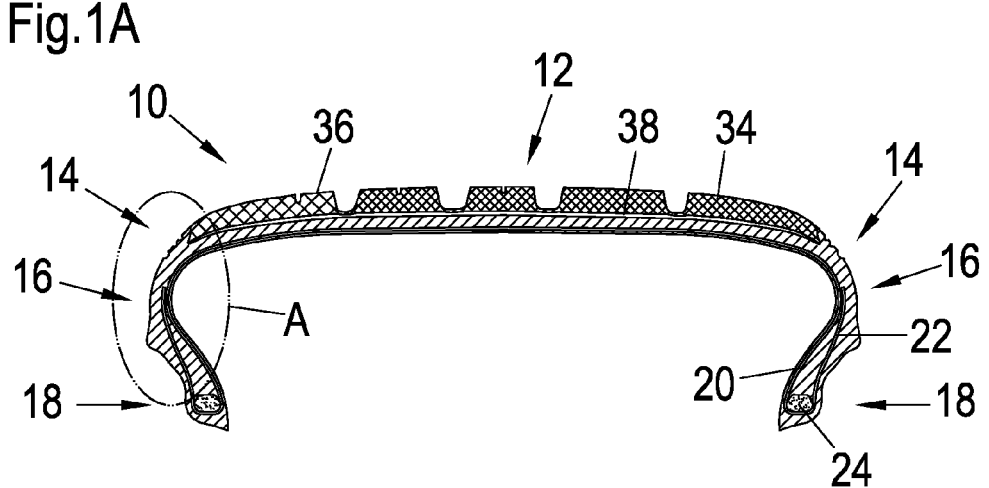
FIG. 1A is a schematic section of a tire in accordance with the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1A, a pneumatic tire 10, in particular a radial ply tire, is illustrated which includes a tread portion 12 extending between a pair of shoulder portions 14 and a pair of sidewall portions 16. The tread 12 is made of a rubber compound and is that portion of a tire that comes in direct contact with the road. The sidewall portions 16 each extend between a pair of opposing bead portions 18 and the tread portion 12. The respective shoulder portions 14 are arranged between the sidewall portions 16 and the tread portion 12. The tread portion 12, the shoulder portions 14, the sidewall portions 16, and the bead portions 18 are all supported by a carcass 20 which extends from one bead portion 18 to the other bead portion 18. The carcass 20 also comprises turn-up portions 22 which surround bead cores 24 of the tire 10. A tread reinforcing ply or breaker 26 is placed between the carcass 20 and the tread portion 12. In addition, a rubber layer 38 is provided between the tread 12 and the breaker 26. On each of its sides, the tread 12 comprises a wing 40 bridging the main tread area and the respective sidewall 16 (FIG. 1B).

Figure 1B:
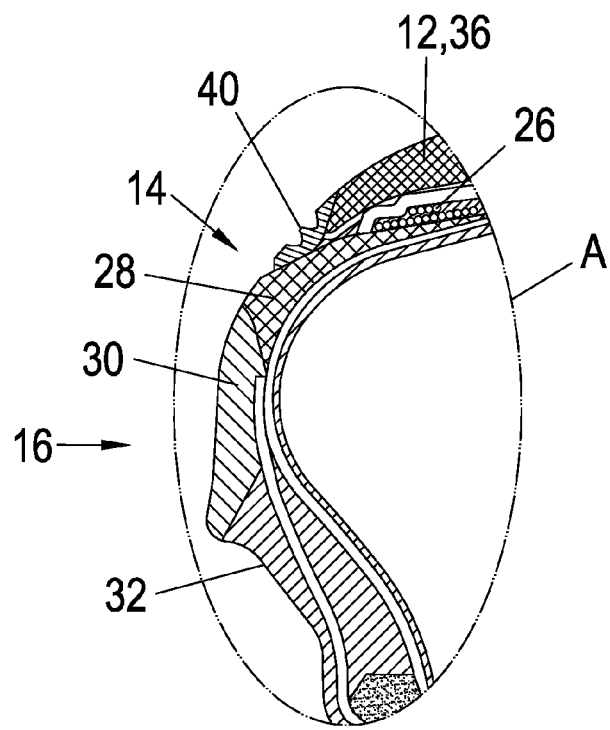
FIG. 1B is a schematic view of insert A of FIG. 1A.

FIG. 1B shows an enlarged view of the sidewall portion 16 of FIG. 1A on the outer side of the tire 10. As can be seen from FIG. 1A and 1B, the shoulder and sidewall portions 14, 16 have a low hysteresis rubber compound 28 and a handling rubber compound 30. The material composition of the handling compound 30 is different from the material composition of the hysteresis compound 28. The low hysteresis compound 28 has a hysteresis which is lower, preferably at least 20% lower, than that of the handling compound 30, and preferably than that of a conventional rubber compound, in particular as mentioned below. Further, the stiff handling compound 30 has a stiffness which is higher, at least at least 20 percent higher, than that of the low hysteresis compound 28, and preferably than that of a conventional rubber compound, in particular as mentioned below.

The low hysteresis rubber compound 28 is disposed partly in a radially outwardly facing part of the sidewall portion 16 of the tire 10, partly in the shoulder portion 14 of the tire 10, and partly in a region underneath the breaker 26. In particular, the low hysteresis rubber compound 28 starts underneath the main tread area and the breaker 26, respectively, and extends beyond the wing 40 to appear at the surface of the tire 10. Out there, the low hysteresis rubber compound 28 may come in contact with the road, in particular when cornering.

The handling rubber compound 30 is disposed in a middle part of sidewall portion 16 where the axial extension of the tire 10 or width is largest. The handling compound 30 is arranged between the low hysteresis compound 28 and the bead portion 18, i.e. the low hysteresis compound 28 is arranged between the tread portion 12 and the handling compound 30. The handling rubber compound 30 is of trapezium shape, wherein the base of the trapezium is sideways tilted. The handling rubber compound 30 is arranged to overlap with each of the hysteresis rubber compound 28 and a conventional rubber compound as mentioned below. The ply turn-up portion 22 extends along and in contact with the axially inwardly facing side of the handling rubber compound 30 and ends in a contact region with the low hysteresis compound 28.

As the tire 10 rotates it experiences repeated cycles of deformation and recovery. The related hysteresis energy loss resulting from a corresponding flexing of the tire 10 is dissipated as heat and is the main cause of rolling resistance of the tire 10. Thus, the terms low hysteresis and low hysteresis compound may as well be replaced by the terms low rolling resistance and low rolling resistance compound, respectively, throughout the present disclosure. On the other hand, generally, the higher the stiffness of a rubber compound of a tire the better the handling response of that tire.

Due to its unique construction, the tire according to the present disclosure is particularly suited as a high performance passenger tire for which the design of the shoulder and sidewall portions 14, 16 plays a decisive role in terms of vehicle handling and driving stability. The multi-compound shoulder/sidewall area 14, 16 according to the present disclosure, in particular in combination with the low hysteresis compound 28 reaching underneath the breaker 26 and/or to the surface of the tire 10, ensures a high tangential and/or torsional stiffness of the sidewall 16 and at the same time reduces the heat generated in the radially outwardly facing region of the sidewall 16 and/or shoulder portion 14 of the tire 10. Thus, rolling resistance can be reduced where it occurs the most while keeping good handling performance of the tire 10. In addition, the rubber layer 38 is a compound optimized for low rolling resistance. This generally extends the lifetime of the tire 10 and improves the fuel efficiency of the tire 10.

Other than a tire having only a single-compound shoulder/sidewall region which is optimized either for low rolling resistance or for good handling performance, the tire according to the present disclosure provides the best of both worlds.

The material compositions of low hysteresis and stiff handling rubber compounds, respectively, and of all other compounds mentioned in this disclosure are known in the art.

In its radially inwardly facing part merging into the bead portion 18, the sidewall 16 may comprise a conventional rubber compound 32 which has a hysteresis which is higher than that of the low hysteresis compound 28 and/or has a stiffness which is lower than that of the handling compound 30. The radially inwardly facing part of the sidewall 16 may, however, as well be made integrally with the middle part of the sidewall 16 and be made from the same compound material as the middle part of the sidewall 16, respectively, i.e. may be made from the handling compound material as well. Thus, in principle, the sidewall 16 may be made as a two-compound sidewall or as three-compound sidewall.

As can also be seen from FIG. 1A, the tread portion 12 is an asymmetric tread portion 12, i.e. it has an inner tire tread compound 34 which is larger than an outer tire tread compound 36. In the embodiment shown the outer tire tread compound 36 is a dry grip compound 36 and the inner tire tread compound 34 is a wet compound 34. The asymmetric division of the tread portion 12 ensures a high lateral grip by using the dry grip compound 36 in the outside shoulder and a wet compound 34 in the center and inner shoulder of the tire 10, respectively.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A tire including
a tread portion (12),
a pair of opposing sidewall portions (16), and
a pair of shoulder portions (14) each arranged between said tread portion (12) and one of said sidewall portions (16), and
a pair of opposing bead portions (18),
wherein at least on one side of said tire (10) said sidewall and shoulder portions (14, 16) comprise at least a first rubber compound (28) and a second rubber compound (30),
said second rubber compound (30) having a material composition different from that of said first rubber compound (28),
wherein said first rubber compound (28) has a hysteresis at least 20 percent lower than the hysteresis of said second rubber compound (30),
wherein said second rubber compound (30) has a stiffness at least 20 percent greater than the stiffness of said first rubber compound (28),
wherein the first rubber compound (28) is disposed as an axially outermost portion of the shoulder portion (14) as an exposed portion of the tire and extends to and beneath the tread portion (12),
wherein the said second rubber compound (30) is disposed as an axially outermost portion of the sidewall portion (16),
wherein said sidewall portion (16) further contains a third rubber compound (32) which is disposed as an radially innermost portion of the sidewall portion (16) and arranged between the second rubber compound (30) and respective bead portion (18),
wherein third rubber compound (32) has a higher hysteresis than said first rubber compound (28) and a lower stiffness than said second rubber compound (30).

* * * * *